Aug. 8, 1972     H. J. GERBER     3,682,750
CUTTING APPARATUS WITH VACUUM HOLD-DOWN AND CUT SEALING MEANS
Filed Dec. 9, 1969
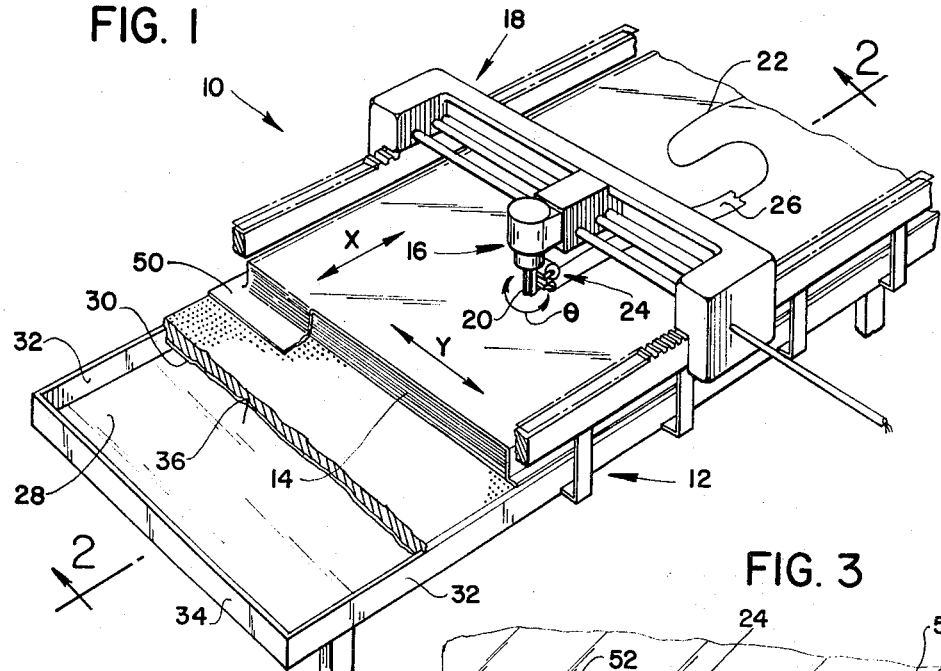
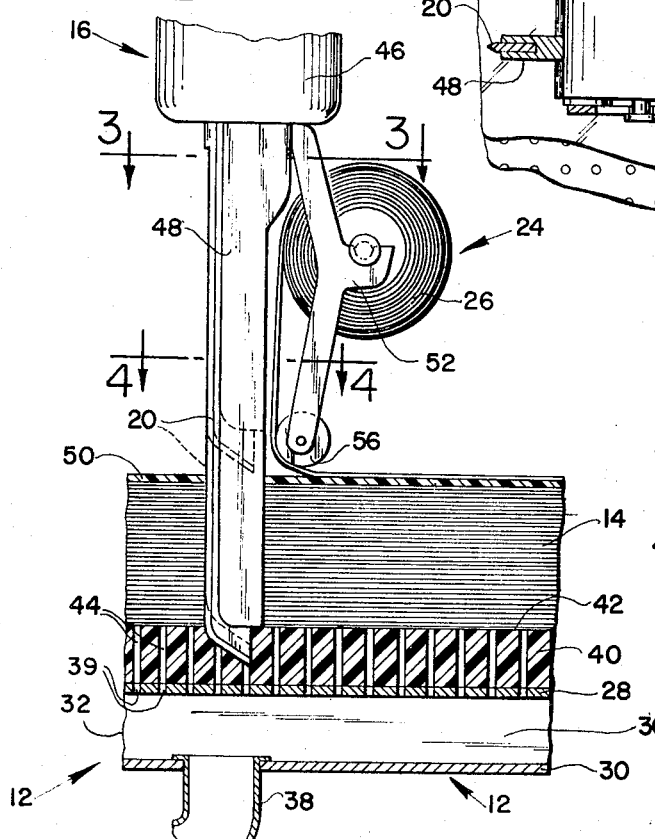
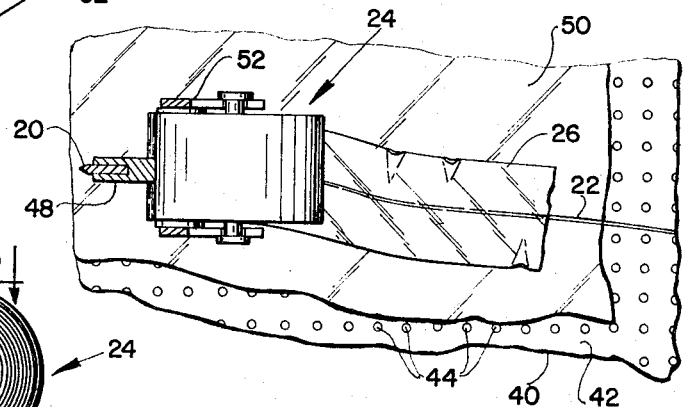
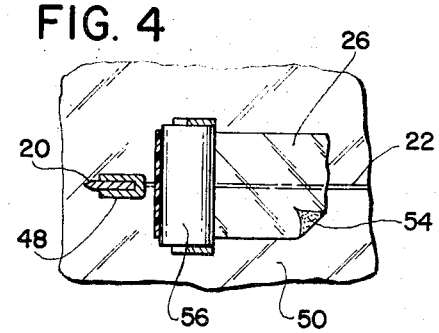
*INVENTOR.*
HEINZ JOSEPH GERBER
BY
McCormick, Paulding & Huber
ATTORNEYS United States Patent Office 3,682,750
Patented Aug. 8, 1972

3,682,750
CUTTING APPARATUS WITH VACUUM HOLD-DOWN AND CUT SEALING MEANS
Heinz Joseph Gerber, West Hartford, Conn., assignor to Gerber Garment Technology, East Hartford, Conn.
Filed Dec. 9, 1969, Ser. No. 883,438
Int. Cl. B32b *31/08, 31/06*
U.S. Cl. 156—545           3 Claims

ABSTRACT OF THE DISCLOSURE

Apparatus particularly adapted for cutting a porous workpiece such as, for example, a fabric layup or the like and having a vacuum hold-down table including a workpiece supporting surface and a sheet or panel of thin flexible substantially air-impervious sheet material for substantially covering the exposed surface of a workpiece supported on the table surface. The sheet material cooperates with the vacuum table to draw the workpiece toward the supporting surface and to apply compacting force thereto. A reciprocably movable cutter or blade is supported for movement relative to the table surface to advance in cutting engagement with the sheet material and the workpiece to form a cut therein. A payoff reel mounted on the blade supporting means carries the roll of sealing tape which is dispersed in overlying relation to the cut as the blade advances to seal an associated portion of the cut against substantial passage of air therethrough thereby minimizing vacuum loss.

BACKGROUND OF THE INVENTION

This invention relates in general to cutting apparatus and deals more particularly with an improvement in apparatus of the type which includes vacuum hold-down means for securing a workpiece in fixed position on a supporting surface as a cutter moves relative to and cuts through the workpiece.

When apparatus of the aforedescribed general type is used to cut a substantial non-porous workpiece, the workpiece is held in a fixed position on the supporting surface by direct application of vacuum to the surface of the workpiece in contact with the supporting surface. If the character of the workpiece is such that the cutter must pass through the workpiece to cut it, as, for example, a piece of sheet material, some vacuum loss may occur as air enters the cut formed in the material to decrease the efficiency of the hold-down means.

Apparatus of the aforedescribed character has also been provided for cutting porous material, such as a layup of porous fabric. In this instance, an expendable hold-down sheet of substantially air-impervious material is provided to overlie or cover exposed portions of the workpiece supported by the supporting surface so that vacuum is applied through the porous workpiece to the undersurface of the hold-down sheet. Thus, the hold-down sheet cooperates with the vacuum hold-down means to draw the workpieces toward the supporting surface and to apply compacting force thereto while both the workpiece and the expendable sheet are simultaneously cut by an advancing cutter. As air enters the cut formed in the expendable sheet, vacuum loss occurs and both the holding and compacting efficiency of the vacuum hold-down means is reduced.

Accordingly, the present invention provides means to substantially reduce vacuum loss in an apparatus of the aforedescribed type, which loss results from cutting through a workpiece or a hold-down sheet used in co-operation with a vacuum hold-down means to hold the workpiece while it is cut.

SUMMARY OF THE INVENTION

In accordance with the present invention, a cutting apparatus which includes a workpiece supporting surface, a vacuum hold-down means and a cutter supported for movement relative to the supporting surface to advance in cutting engagement with a workpiece supported on the surface and held in fixed position thereon by the hold-down means is provided with means for dispensing a quantity of sealing material rearwardly of the cutter to seal the cut formed thereby as the cutter advances in cutting engagement with the workpiece.

BRIEF DESCRIPTION OF THE DRAWING

FIG. 1 is a fragmentary perspective view of a cutting apparatus embodying the present invention.
FIG. 2 is a somewhat enlarged fragmentary sectional view taken along the line 2—2 of FIG. 1.
FIG. 3 is a fragmentary sectional view taken along the line 3—3 of FIG. 2.
FIG. 4 is a fragmentary sectional view taken along the line 4—4 of FIG. 2.

DETAILED DESCRIPTION OF THE PREFERRED EMBODIMENT

In the drawing and the description which follows, the present invention is illustrated and described with reference to a cutting apparatus particularly adapted for cutting fabric and other sheet material of either porous or non-porous character, however, it should be understood that the invention may be practiced with any cutting apparatus which includes a vacuum holding device and wherein loss of vacuum and the consequential loss of holding efficiency occurs when a cutter associated with the apparatus penetrates or cuts into or through a workpiece held by the apparatus. Turning now to the drawing and first considering FIGS. 1 and 2, an apparatus for cutting fabric or other sheet materials and embodying the present invention is indicated generally at 10. The apparatus 10 is more particuarly adapted to cut a spread or layup of sheet material which comprises one or more sheets of material in response to input signals supplied to the apparatus by an associated control means such as, for example, a computerized or numerically controlled controller (not shown). More particularly, the apparatus 10 comprises an elongated vacuum hold-down table indicated generally at 12 to provide support for a workpiece or layup 14 which comprises layers of sheet material arranged in face-to-face or face-up vertically stacked relation. A cutting apparatus designated generally by the reference numeral 16 is supported by a movable carriage indicated generally at 18 to traverse the surface of the table 12 in two coordinate directions indicated by the arrows X and Y in response to position signals supplied by the controller. The cutting tool may take various forms, but preferably, and as shown, it includes an elongated cutter or blade 20 supported for vertically reciprocating movement in cutting engagement with the layup 14. The blade 20 is movable along any line which may be straight or curved, such as required in cutting a garment component or the like, and is further arranged for angular movement or rotation about its own axis in a direction indicated by the arrow θ and for vertical movement into and out of cutting engagement with the layup 14.

As the blade 20 advances in cutting engagement with the layup 14, a slit or cut 22 is formed through which air may pass to the surface of the vacuum hold-down table 12 causing a loss of vacuum and a resulting loss of table holding efficiency. In accordance with the present invention, the apparatus 10 is provided with a sealing device indicated generally at 24 for dispensing a quantity of sealing material 26 as the cutter advances to substantially seal an associated portion of the slit 22 formed by the cutter to prevent passage of air therethrough.

Considering the apparatus 10 in further detail, the table 12 has a horizontally disposed generally rectangular base which includes upper and lower plates respectively indicated at 28 and 30 joined together by longitudinally extending side members 32, 32 and transversely extending end members such as indicated at 34 to define a vacuum chamber 36. Vacuum is applied to the table 12 by a duct 38 which communicates with the chamber 36 and is connected to a suitable vacuum source (not shown), the source preferably being one of high flow rate capacity. The plate 28 has a plurality of passageways 39, 39 formed therein which open through its upper surface and communicate with the chambers 36. The upper surface of the plate 28 may serve as a supporting surface for the layup 14 but preferably, and as shown, a bed of material 40 is supported on the upper plate which has an upwardly facing surface 42 to provide the workpiece supporting surface. Various materials may be used to form the bed 40, but preferably it comprises a resilient low density cellular polyethylene plastic material which may be readily penetrated by the blade 20. The blade is preferably adjusted to penetrate the bed to assure accurate and efficient cutting of the lower layers comprising the layup. A plurality of passageways 44, 44 formed in the bed material 40 extend therethrough and cooperate with the passageways 39, 39 for conducting vacuum from the chamber 36 to the surface 42 and thence applying vacuum to the lower surface of the layup 14. If the bed material is porous as, for example, a foam plastic with an open cell structure, the porosity of the material may provide the passageways 44, 44.

Further considering the cutting tool 16, the blade 20 is carried and driven by a drive unit 46 which has a blade sheath 48 depending therefrom to provide additional support for the blade which is reciprocably movable relative to the sheath. The drive unit 46 is supported for movement in the X direction by the carriage 18 which bridges the table 12 and is movable transversely of the table or in the Y direction relative to the carriage. For further disclosure of the manner in which the carriage is supported and driven relative to the table, as well as details relative to the preferred table structure and cutting tool, reference may be had to United States Patent 3,495,492 to Gerber et al., issued Feb. 7, 1970, and entitled "Apparatus for Working on Sheet Material."

When a layup of porous material is to be cut, as in the illustrated case, a substantially imperforate or air-impervious expendable panel or sheet material 50 which may be readily cut by the blade 20 is provided for positioning in overlying relationship with the layup, as best shown in FIGS. 1 and 2. The sheet 50 is imperforate in the sense that it is substantially impervious to the passage of air therethrough. Relatively thin, flexible plastic film, such as polyethylene sheet, has proved particularly satisfactory for this purpose. The sheet 50 is preferably of such a size and so spread as to extend over the entire upper surface of the layup, down the sides thereof and across portions of the supporting surface 42 adjacent the sides of the layup, thereby completely enveloping the layup.

At the start of the cutting process, the blade 20 and the sheath 48 are elevated or raised to a position above the layup, as indicated by broken lines in FIG. 2, and moved to a preselected starting position relative to the upper surface of the layup. Thereafter, the blade and sheath are lowered to penetrate the layup and the cutting cycle proceeds in accordance with a programmed pattern so that a cut 22 is formed in both the layup 14 and the expendable sheet 50 as the cutting tool 16 advances in accordance with its programmed pattern. It will be evident that some vacuum loss will inevitably occur to reduce the holddown efficiency of the vacuum table 12 as air enters the cut 22. The sealing device 24 is provided to dispense a quantity of sealing material to form a closure for the cut and thereby minimize this vacuum loss.

The sealing device may take various forms, however, in accordance with presently preferred practice the device 24 comprises a dispenser or payoff reel 52 mounted in a stationary position on the blade sheath 48 rearwardly of the blade 20. A roll of sealing material or tape 26 carried by the reel 52 is dispensed behind the blade 20 as it advances. Various sealing materials may be used, however, thin polyethylene tape substantially identical to the material of the sheet 50 has been found particularly suitable for this purpose. The tape 26 may, if desired, be provided with a light adhesive backing 54, as shown on the turned-up corner of the tape 26 in FIG. 4. The adhesive is used to adhere the tape to the sheet 50 or directly to the workpiece at the beginning of the cutting cycle to assure proper dispensing of the tape as the program cycle proceeds. The adhesive backing is not essential, however, since the vacuum applied to the lower surface of the tape through the cut 22 tends to hold the tape in tight sealing engagement with the underlying surface of the sheet 50 or directly to the underlying workpiece as, for example, when the workpiece is of non-porous character and the sheet 50 is not required.

In the illustrated case, the sealing device 24 also includes a guide roll 56 for guiding the sealing tape 26 into overlying relation with the cut 22 near the rear of the blade 20 to effect maximum sealing efficiency and thereby minimize vacuum loss.

I claim:

1. In a cutting apparatus having an elongated workpiece supporting surface, a vacuum source associated with the workpiece supporting surface, means for applying vacuum from the vacuum source to retain a workpiece in a relatively fixed position on the workpiece supporting surface, a cutting tool having a movable blade, means supporting the cutting tool for longitudinal and transverse movement relative to the workpiece supporting surface to advance the blade in cutting engagement with the workpiece for forming a cut therein through which air may pass to the vacuum source, the improvement comprising a roll of tape for sealing the cut, a payoff reel mounted on the cutting tool rearwardly of the blade for movement with the cutting tool and for carrying and dispensing said tape as the blade advances, and a guide roll carried by the cutting tool and disposed rearwardly of the blade in close proximity thereto between said payoff reel and said supporting surface and adapted to be disposed in close proximity to the surface of the workpiece when the blade is in cutting engagement therewith for guiding said tape into overlying relation with the cut formed by the advancing blade, whereby to substantially seal an associated portion of the cut to prevent passage of air therethrough.

2. The combination as set forth in claim 1 including a piece of substantially air-impervious sheet material for covering at least a portion of the exposed surface of the workpiece and wherein the means for applying vacuum is further characterized as means for connecting the vacuum source to the apparatus to communicate with and evacuate air from the space between the sheet material and the workpiece supporting surface and the supporting means is further characterized as means supporting the cutting tool to advance the blade in cutting engagement with both the sheet material and the workpiece to form a cut therein, the improvement wherein said tape consists of the same material as the sheet material and is guided into overlying relation with the cut formed in the sheet material by the advancing blade.

3. In a cutting apparatus having an elongated workpiece supporting surface, a vacuum source associated with the workpiece supporting surface, means for applying vacuum from the vacuum source to retain a workpiece in a relatively fixed position on the workpiece supporting surface, a cutting tool having a depending blade sheath supported for movement toward and away from said supporting surface and a depending blade partially supported by the sheath for generally vertical reciprocating movement relative to the sheath and the supporting surface, the blade and the sheath being angularly movable in unison about a generally vertical axis relative to the supporting surface, and means supporting the cutting tool for both longitudinal and transverse movement relative to the supporting surface to advance the blade in cutting engagement with the workpiece for forming a cut therein through which air may pass to the vacuum source, the improvement comprising a roll of tape for sealing the cut, a payoff reel mounted on the blade sheath rearwardly thereof and movable therewith and relative to the supporting surface for carrying and dispensing said tape as the cutting tool advances and a guide roll carried by said payoff reel and disposed rearwardly of the blade in close proximity thereto between said payoff reel and the supporting surface and adapted to be disposed in close proximity to the surface of the workpiece when the blade is in cutting engagement therewith for guiding said tape into overlying relation with the cut formed by the advancing blade, whereby to substantially seal an associated portion of the cut to prevent passage of air therethrough.

References Cited

UNITED STATES PATENTS

| | | | |
|---|---|---|---|
| 3,495,492 | 2/1970 | Gerber et al. | 83—422 X |
| 2,997,099 | 8/1961 | Pike | 156—545 X |
| 1,172,058 | 2/1916 | Scheyer | 83—71 |
| 3,477,322 | 11/1969 | Gerber et al. | 83—451 X |
| 2,947,346 | 8/1960 | Thompson | 156—545 X |
| 3,416,988 | 12/1968 | Dryden | 156—545 |

BENJAMIN A. BORCHELT, Primary Examiner

J. M. HANLEY, Assistant Examiner

U.S. Cl. X.R.

83—428, 925; 156—512, 535